(12) United States Patent
Schmidt

(10) Patent No.: US 6,857,604 B2
(45) Date of Patent: Feb. 22, 2005

(54) SHOCK WAVE ABSORBER

(76) Inventor: Eric T. Schmidt, 524 Commerce, Wichita, KS (US) 67202

( * ) Notice: Subject to any disclaimer, the term of this patent is extended or adjusted under 35 U.S.C. 154(b) by 0 days.

(21) Appl. No.: 10/794,439

(22) Filed: Mar. 4, 2004

(65) Prior Publication Data

US 2004/0195430 A1 Oct. 7, 2004

Related U.S. Application Data

(63) Continuation-in-part of application No. 10/198,369, filed on Jul. 18, 2002, now abandoned.
(60) Provisional application No. 60/306,513, filed on Jul. 18, 2001.

(51) Int. Cl.$^7$ .................................................. B64C 1/38
(52) U.S. Cl. ....................................................... 244/130
(58) Field of Search ............................ 244/10, 216, 113, 244/138, 130

(56) References Cited

U.S. PATENT DOCUMENTS

| | | | | |
|---|---|---|---|---|
| 1,414,418 A | * | 5/1922 | Jaray ............................ 416/94 |
| 2,050,903 A | * | 8/1936 | Topliff ............................ 244/9 |
| 2,136,403 A | * | 11/1938 | Vance et al. ................. 244/198 |
| 2,177,887 A | * | 10/1939 | Huet ............................ 105/1.1 |
| 2,261,558 A | * | 11/1941 | Orloff ........................... 244/130 |
| 2,894,703 A | * | 7/1959 | Hazen et al. ................ 244/199 |
| 2,899,150 A | * | 8/1959 | Ellis ............................ 244/200 |
| 2,916,230 A | * | 12/1959 | Nial ............................. 244/15 |
| 3,259,065 A | * | 7/1966 | Ross et al. .................... 244/3.1 |
| 3,568,956 A | * | 3/1971 | Swanson ..................... 244/206 |
| 3,604,661 A | * | 9/1971 | Mayer, Jr. ................... 244/207 |
| 3,794,274 A | * | 2/1974 | Eknes ........................ 244/130 |
| 3,934,923 A | * | 1/1976 | Lissaman et al. ........ 296/180.2 |
| 4,285,482 A | * | 8/1981 | Lewis .......................... 244/207 |
| 4,358,075 A | * | 11/1982 | Antonov .................. 244/134 R |
| 4,442,986 A | * | 4/1984 | Rousseau .................... 244/12.1 |
| 4,504,031 A | * | 3/1985 | Andrews ..................... 244/113 |
| 4,736,912 A | * | 4/1988 | Loebert ....................... 244/130 |
| 4,907,765 A | * | 3/1990 | Hirschel et al. ............ 244/200 |
| 4,917,335 A | * | 4/1990 | Tidman ....................... 244/130 |
| 4,962,903 A | * | 10/1990 | Byron ..................... 244/117 A |
| 5,171,623 A | * | 12/1992 | Yee ............................. 428/156 |
| 5,378,524 A | * | 1/1995 | Blood ......................... 428/141 |
| 5,449,136 A | * | 9/1995 | Doria Iriarte ............... 244/199 |
| 5,836,549 A | * | 11/1998 | Bushman .................... 244/203 |
| 6,161,802 A | * | 12/2000 | Cunningham, Jr. ......... 244/199 |

* cited by examiner

Primary Examiner—Michael J. Carone
Assistant Examiner—Stephen A. Holzen
(74) Attorney, Agent, or Firm—Bradley P. Sylvester

(57) ABSTRACT

A cavity is provided on the leading edge of an object that is subject to the flow of liquids or gasses, where said cavity preferably has a wall that follows the curvature of a diminishing sine wave, although other configurations are possible that do not follow a specific sine wave. The cavity accepts the flow of liquids or gasses that enter into the cavity, and where the dimensions of the cavity cause the flow of liquids or gases within it to form a pressure node that extends forward of the cavity. The pressure node provides a wedge means to cause oncoming gasses or liquids to divert around the object body ahead of the object body itself, decreasing turbulence around the periphery of the object. The cavity may be spherical, in the instance of a missile, plane, or underwater transportation means, or may be linear, in the instance of an automobile grill that is subject to wind, or a bridge support, where the bridge support has to maintain position against the flow of current. The cavities may also be defined only on the front or leading edge, or concurrently on the front leading edge and the rear aft edge of the object to allow efficient movement both forward and aft.

13 Claims, 3 Drawing Sheets

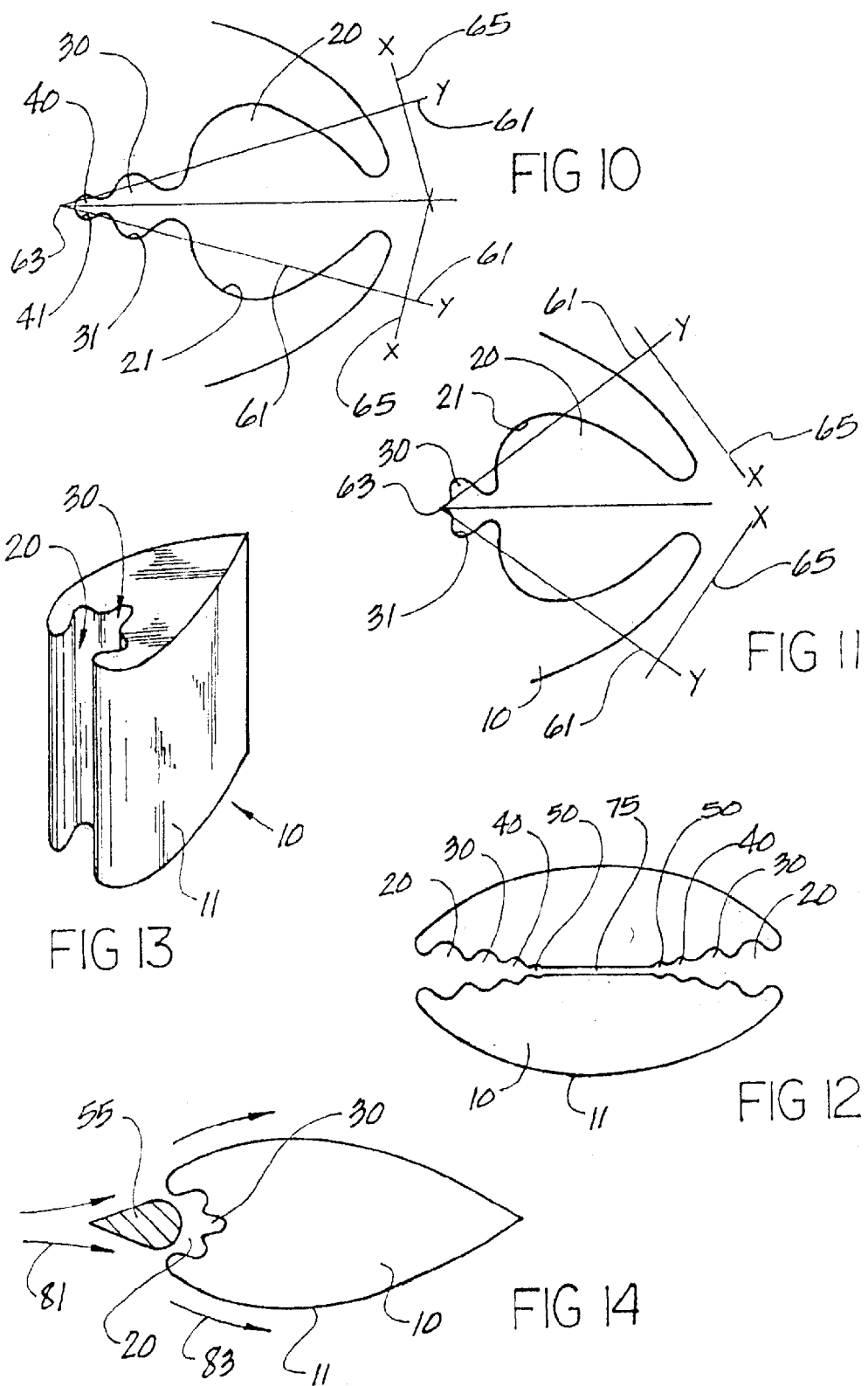

SHOCK WAVE ABSORBER

This application claims the benefit of Provisional Application No. 60/306,513, filed Jul. 18, 2001.

This is a continuation in part of application Ser. No. 10/198,369, now abandoned, filed Jul. 18, 2002, inventor Eric Schmidt No Federally sponsored research or development.

No incorporation-by-reference materials are included with this application

BACKGROUND OF THE INVENTION

Air resistance provides a formidable barrier to objects moving at high rates of speed. There have been numerous efforts to minimize the effects of moving air over and around a cylindrical body. It is not only the air that must be pushed aside in order for the body of a cylindrical object to move freely through the air, but air resistance and drag may also be caused by turbulence against the outer skin of a cylindrical body, which diminishes aerodynamic design benefits. When considering the reduction of drag on a cylindrical object, the shape and configuration of the foremost section of a moving object, generally referred to as the nose cone, is an important aspect to minimizing the resistance of the air against the outer surface of the moving object.

It is common for airplanes that fly at subsonic speeds to have bulbous nose cones, which affect the air moving around it, so that it provides the least turbulence against the body of the plane. Supersonic bodies may present a more pointed nose cone, as the dynamics of airflow change from the subsonic to the supersonic speed. In both cases, the nose cone is the surface that contacts the air initially, and causes it to move in the most optimal manner around the following body.

Allowing a smooth air airflow around a surface area is well-recognized as a means to reduce drag. For example, in U.S. Pat. No. 4,989,807 (Foreman et al.), the injection of an airflow in the bent portion of an s-shaped air intake allows the airflow to be uniform and minimizes pressure drops within the air intake duct. This is a result of the circulating effect of air between the airflow and the inner walls of the duct, where the injected air actually provides a cushion between the high rate of flowing air and the duct wall.

High speed projectile technology for items moving through water have encompassed the idea that the shape of the nose may be done in a manner so as to provide a cavitation bubble around the body of the projectile so as to reduce hydro-dynamic drag. This is example in U.S. Pat. No. 5,955,698 (Harkins et al.). The shape of the nose cone in this invention is to provide a shaped insert that protrudes outward and forward of the projectile.

U.S. Pat. No. 4,522,357 (Bains et al.) And U.S. Pat. No. 4,573,648 (Morenus et al.) examples an attempt to take advantage of the air moving around a high-speed object for purposes of guidance. In this invention, an air inlet is provided in the nose of a missile, where the air moving through the air inlet is directed to a specific outlet port that assists in guiding the missile.

U.S. Pat. No. 3,995,558 (Travor et al.) examples the type of efforts to use an air intake having an inlet port and outlet ports where onrushing air is allowed to move through the nose down in such a manner that will provided a laminar boundary area of air between the body of the object and the air it is moving through. This cuts down on overall resistance. The ports themselves allow air to be projected rearward along the sides of the object, and attempt to provide a secondary cushion of air between the atmosphere and the skin of the object.

While prior art has attempted to use air inlets defined by the nose cone to reduce overall resistance, such an air inlet has had a flow-through air outlet. The present invention does not use a separate air outlet, but uses the shape of the cavity to create a central high pressure area that projects outward from the opening of the nose cone cavity, so as to create a pressure spike that directs oncoming air around the body.

Prior art does not teach the use of a pressure spike to direct oncoming air flow, nor does it teach multiple chambers, which may be used to encourage rapid creation of the pressure spike within the largest or primary chamber. This also prevents the pressure spike from rapidly dissipating during movement through the air. The cavities defined in this invention are also useful with regard to movement through air, as well as through water, since a cavity chamber can provide a water pressure spike that allows the water in front of the nose of the object moving through the water more easily as the spike causes a cavitation bubble and stationary water is able to be directed around the body of the object.

BRIEF SUMMARY OF THE INVENTION

Aircraft and other similarly shaped objects encounter resistance as a result of the difference in relative speed between the object and the air through which it is moving. Since the object must move a portion of the air around it as it moves forward, the air creates drag as a result of the friction of the air against the outer skin of the object. Certain amounts of drag can be reduced through aerodynamic design, but there exists a continuing problem with how best to direct the air initially at the front leading edge of the object so as to reduce friction along the length of the object's body.

This invention incorporates a cavity that is defined in the forward portion, also referred to as the front leading edge of the object, with said cavity defining an interior that is conducive to causing air to rotate within said cavity. Air enters into the cavity as a direct result of the object's relative movement through the air. The air enters initially as a result of an increase in pressure against the opening of the cavity as the object moves forward. As the relative speed of the object increases, a greater quantity of air will be forced into the mouth of the cavity. The shape of the cavity causes air moving against the wall of said cavity to encourage rotation of the air within said cavity. The rotation of air in a three-dimensional model causes a central node of increased pressure, where said central node of increased pressure will be significant enough to cause air in the central node to be expelled out of the mouth of the cavity creating a protruding pressure front or protruding pressure node.

The air that is expelled out of the cavity creates a pressure front that extends forward of the object. The distance of the extension of the pressure front is dependent on the speed of the object relative to the air, and to the configuration of the cavity creating said pressure front.

The protruding pressure front causes air to begin to be redirected so as to move around the body of the object before the air has a chance to physically impact the outer skin of the object. This reduces drag on the front part of the object, since the previously redirected air has less turbulence caused by the object itself, as it begins to move around the object. The turbulence is lessened further by the pressure front which modifies the direction of air relative to the object using relative pressure differentials, as opposed to a physical barrier such as the outer skin of the object. Air moving around the front or leading edge of the object has a significant drop in turbulence, which likewise reduces the overall drag.

The optimal shape of the cavity is dependent on the medium through which the object is traveling. Water presents a different criteria than does air, since the mass of the water is greater than the air, and the relative speed of the object through water is generally lower than the relative speed of an object through the air. Airborne objects encounter atmospheric pressure differentials at various altitudes, and this may also play a factor in determining the optimal cavity configuration. For example, an object intended to move at high altitudes with greater speed than an object at lower altitudes, will have different optimal cavity configurations. Objects in the water will exhibit a protruding wave front, in some aspects similar to the pressure wave front provided by the bow of a moving boat.

The cavity is defined by an opening centrally located on the leading edge of an object such as a modified nose cone. This would typically be a cylindrical object having a forward nose cone, where the nose cone defines the opening and cavity. The cavity itself is generally spherical. The walls of the cavity may define a single spherical cavity, as well as multiple spherical cavities, where successive cavities are connected to each other, where the forwardmost cavity comprises the cavity with the largest volume, and where the back wall of the forwardmost cavity defines an opening that leads into a successive cavity having similar shape, but which is greatly reduced in size and volume as compared to the forwardmost cavity.

Where multiple cavities are provided, the initial cavity is preferably the largest in maximum circumference, with the successive cavities having a reduced circumference in relation to the successive status of the particular cavity.

The walls of the cavities, where multiple cavities are arranged linearly, preferably follow a diminishing sine wave orientation, when describing the side walls of the cavity in a cross-sectional orientation view. The sine wave comprises a wave form contained within a particular set of radii, where said radii have an angle in relation to a central zero degree vector. The zero degree vector preferably runs through the center of the object body from forward to aft, and defines the center point of each cavity defined within the object body.

While the walls of the cavity may define a single spherical shape, multiple cavity walls follow a diminishing sine wave configuration. Therefore, multiple cavities may comprise two successive cavities, three successive cavities or more depending on the sine wave configuration used.

Successive cavities assist in promoting the rotational configuration in the cavity before it. The successive cavity operates in a similar manner as does the primary or foremost cavity, so that when a pressure front or node extends out of the secondary cavity, it will assist in promoting rotation of the air in the primary cavity, with a pressure node encouraged to develop outward through the opening.

Cavities may be defined on both the forward and aft ends of the object, and the cavities themselves may all be connected to each other through a vent defined between the forward and aft cavities.

It is an object of this invention to provide a means for reducing drag, whereby a high pressure node is projected outward from the forward portion of an object that is intended for rapid movement through air and/or water.

It is a further object of this invention to provide a means whereby a primary cavity has a secondary cavity situated therein, where the secondary cavity assists in the rotation of air and/or water within the primary cavity, to rotate and form a central high pressure node.

It is a further object of this invention to provide a means whereby a modified nose cone, having a defined cavity, can be substituted on existing aircraft, missiles, or any other airborne or underwater objects that require higher levels of speed with reduced drag.

It is a further object of this invention to provide a means whereby a leading edge of an object can provide a forward projecting pressure node on a land vehicle, such as an automobile.

It is a further object of this invention to provide a means whereby a leading edge of an object can provide a forward projecting pressure node using a linear cavity, where the pressure node reduces turbulence for either stationary objects such as bridge supports, or on a land vehicles, such as automobile front ends.

DESCRIPTION OF THE DRAWINGS

FIG. 10 is a cross sectional view of a nose cone having multiple cavities, in which the walls of the cavities are defined through the sine wave as shown in FIG. 8.

FIG. 11 is a cross sectional view of a nose cone having multiple cavities, in which the walls of the cavities are defined through the sine wave as shown in FIG. 9.

FIG. 12 is a cross sectional view of a nose cone having multiple cavities forward and aft, where the cavities are connected by a single vent.

FIG. 13 is a perspective view of an object such as a bridge support, having a cavity that causes a pressure node to extend forward of the cavity, where the cavity is linear rather than spherical.

FIG. 14 is a cross sectional view of the object shown in FIG. 13.

DETAILED DESCRIPTION OF THE INVENTION

Figure 6:
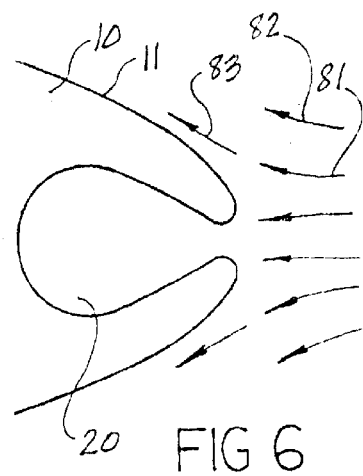
FIG. 6 is a cross sectional view of the nose cone in which the moving air and/or water has not yet entered the cavity.

Referring now to FIG. 6, a typical nose cone 10 is shown, with the direction of air in relation to the nose cone 10 also shown. It should be understood that reference to air and water are interchangeable with regard to the scope of this invention. This invention was intended for use on objects that are to move efficiently through air and/or water. Therefore, the terminology directed toward air should be understood to mean water as well. The term gas is also interchangeable with liquid.

As FIG. 6 shows, air directly in front of the nose cone 10 moves directly against the front leading edge of the nose cone 10. The nose cone skin 11 comprises the outer surface of the nose cone 10. As the moving air 81 impacts the leading edge of the nose cone skin 11, it is pushed to one side as a result of the physical impact of the nose cone skin 11. Redirected air 81 goes along the surface of the skin 111 following route 83. Air moving in close proximity to the skin 11 will react by creating some turbulence, which dramatically increases drag. Air 83 acts somewhat as a buffer in FIG. 6 between moving air 82 and skin 11. FIG. 6 shows a cavity 20, but the interaction of the air within said cavity 20 is not depicted in FIG. 6.

Figure 7:
FIG. 7 is a cross sectional view of the nose cone in FIG. 6, in which the moving air and/or water is being diverted through a projecting high pressure node.

FIG. 7 depicts the same nose cone 10 as shown in FIG. 6. The cavity 20 is again depicted, but the movement of the air within the cavity 20 is further described below. FIG. 7 depicts a protruding high pressure node 55, comprising an area of air or water that has a higher pressure then the air or water around it. The difference in the effects of the existence of the high pressure node 55 are clearly seen in the different pathways the moving air takes. Moving air 81 now contacts the high-pressure node 55 in front of the nose cone 10, and is redirected as flow 83. The air flow 83 is not modified as to direction of flow by the skin 11 of the nose cone 10 as significantly in FIG. 7 as it is in FIG. 6. The air flow 83 will have less turbulence in the configuration shown in FIG. 7, as compared to a nose cone 10 without a protruding high pressure node 55. Therefore, the benefits of this invention are realized when the relative difference in speed between the nose cone 10 and the air 81 becomes significant enough to create a high pressure node 55.

Figure 1:
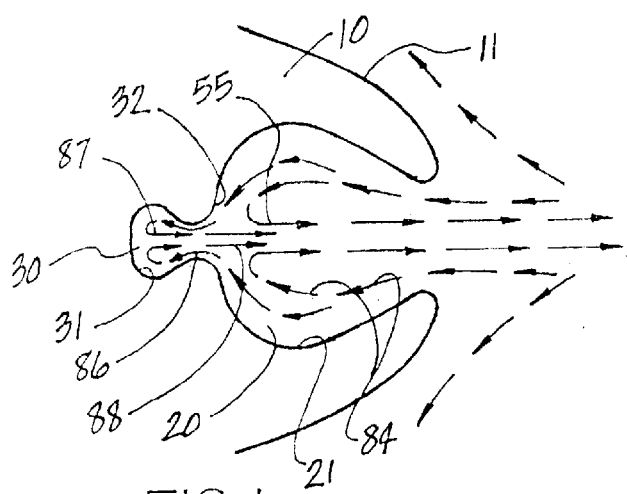
FIG. 1 is a cross sectional view of a nose cone moving at a high speed through air or water, having a defined primary and secondary cavity with the direction of airflow through the cavity and around the nose cone shown, where a central higher pressure node is created projecting the high-pressure node forward of the nose cone.
Figure 2:
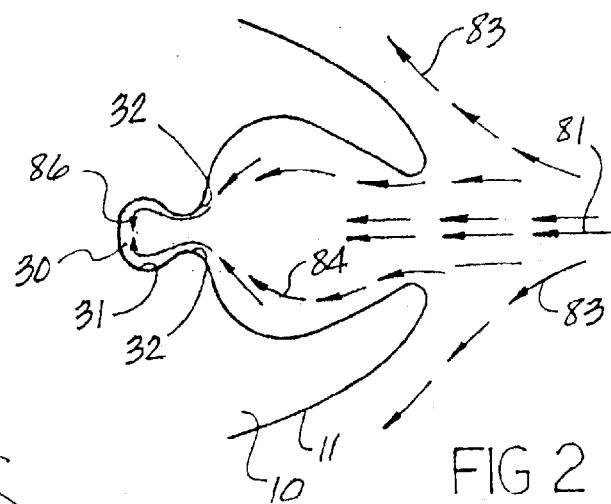
FIG. 2 is a cross sectional view of the nose cone depicted in FIG. 1, where the nose cone is moving at a lower speed relative to water and/or atmosphere, with the airflow or water flow into the cavity being at a lower rate than that shown in FIG. 1.
Figure 3:
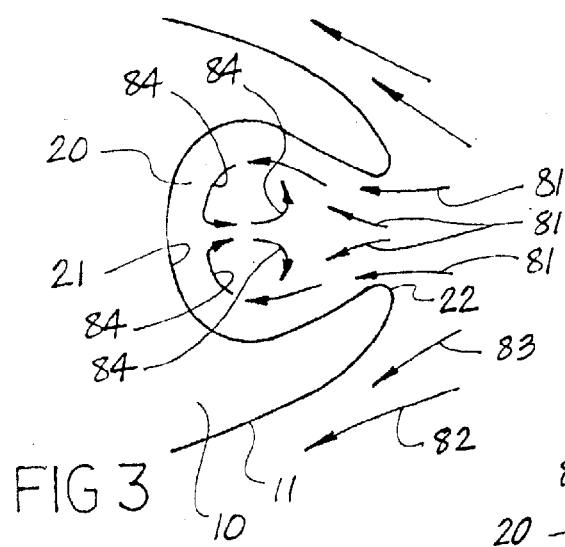
FIG. 3 is a cross sectional view of a nose cone having a single primary cavity, with the atmospheric water flow at a low rate, prior to a central high-pressure node being created within the cavity.
Figure 4:
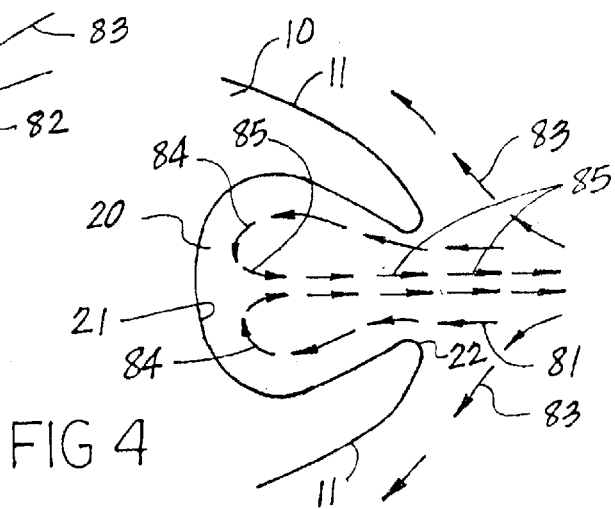
FIG. 4 is a cross sectional view of the nose cone was shown in FIG. 3, where the nose cone is moving at a higher rate of speed and the flow of water or atmosphere through the cavity is sufficient to create a high pressure node in front of the nose cone.

Referring now to FIG. 3 and FIG. 4, a nose cone 10 is shown, and having a similar configuration to that shown in FIGS. 1 and 2. The cavity 20 is showing its most basic form, comprising a generally spherical shape that is slightly elongated as defined by the cavity wall 21 and where a circular mouth 22 defines the opening into the cavity 20.

As shown in FIG. 3, some of the air 81 moves into the cavity 20, while other air 82 and 83 is directed around nose cone 10. As air 81 moves into the cavity 20, the configuration of the cavity 20 will cause the air to begin to rotate as the air moving along the walls 21 of cavity 20 is forced to move from the outer area towards the central area the cavity 20. As the air begins to rotate, it will follow the circular rotational path 84. At this point, the movement of air within the cavity 20 has not yet had an opportunity to create a high-pressure node. Redirected air 82 continues to move past the nose cone 10 with air path 83 providing a turbulent buffer as it is compressed against the skin 11.

As the relative speed of the air and nose cone 10 increase in relation to each other, a higher pressure area or node is formed by the air 81 as it enters the cavity 20. The air pathway 81 follows the cavity wall 21 so that a circular rotation pathway 84 develops, and where all rotation pathways 84 meet, a node of higher pressure is created, and the air pathway 85, having a higher pressure than air existing outside the cavity 20, air pathway 85 will be pushed out of the cavity 20, exiting centrally through the circular mouth 22. The exiting air 85 briefly exhibits a pressure front node that extends forward of the mouth 22 of cavity 20. This causes a pressure projection that redirects air around the nose cone 10, following pathway 83, of the area of redirecting air and accomplished forward of the nose cone 10, so that redirected air 83 is subject to less turbulence and pressure against the skin 11 of nose cone 10.

Figure 5:
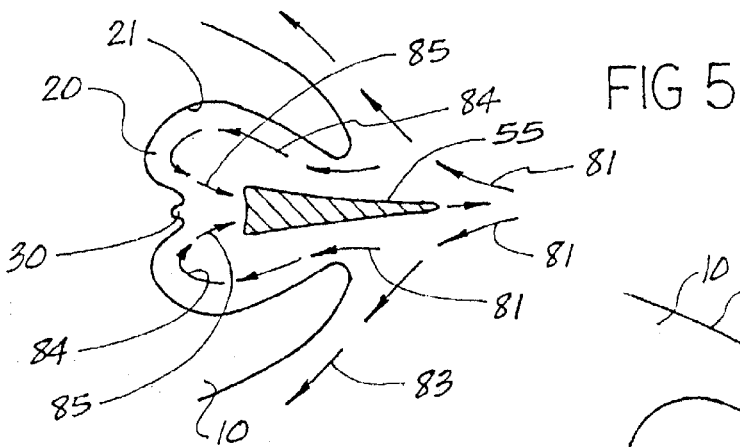
FIG. 5 is a cross sectional view of a nose cone depicting the flow of air, or water into the cavity with the high pressure node indicated as an elongated triangle that protrudes forward out above the cavity mouth.

Referring now also to FIG. 5, a pressure node 55 is shown, in relation to the cavity 20 and the cavity mouth 22. As is shown in FIG. 5, the pressure node 55 projects forward of the nose cone 10, in providing a wedge which causes oncoming air to be diverted. FIG. 5 also shows a secondary cavity 30, which will be discussed in detail below.

In some instances, a better shaped wedge, being the increased pressure node 55, is enhanced through the use of a secondary cavity 30, which assists in redirecting the rotational air 84 toward a central high pressure node area 55. FIG. 2 shows a nose cone 10 that has a primary cavity 20, with the rear most portion of its cavity wall 21 defining a secondary cavity mouth 32, which allows access into a cavity 30 having similar dimensions, but on a smaller scale than the primary cavity 20. Pressurized air 81 enters the primary cavity 20, and moves along the walls 21, with the air beginning to rotate along lines 84. Some of the air flow along lines 84 are able to move through the secondary mouth 32 following air flow 86. The secondary cavity 30 has similar dimensions as the primary cavity 20, and the airflow 86 will be directed along the secondary walls 31 to a central pressure point.

Referring now also to FIG. 3, the air flow 86 in the secondary chamber is forced to meet at a central pressure point, with the air pathway 87 directed back out centrally through the mouth 32 to form a small pressure node that protrudes into the confines of the primary cavity 20. The secondary pressure node area 88 causes air pathway 84 to more easily converge with other similar air flow paths to form a higher pressure area pathway 55 that is directed out of the cavity 20 and forward of the nose cone 10. Referring also again to FIG. 5, the secondary cavity may be quite small in comparison to the primary cavity 20, or may be larger in relation, as shown in FIG. 1 and FIG. 2.

Figure 8:
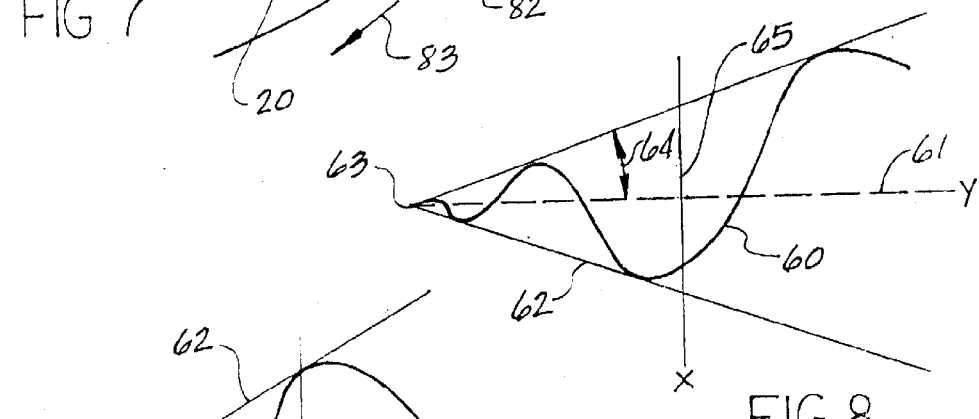
FIG. 8 is an example of a diminishing sine wave.
Figure 9:
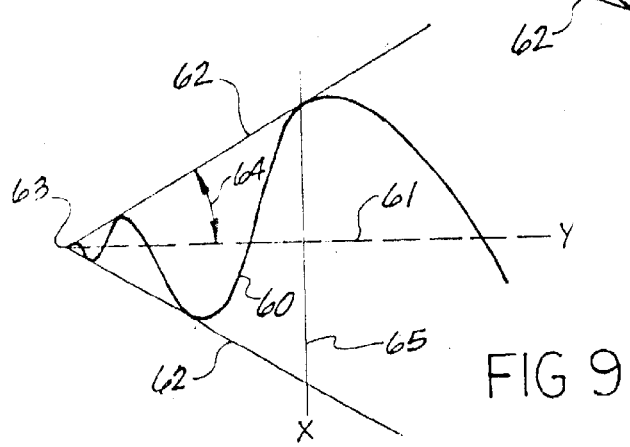
FIG. 9 is an example of a diminishing sine wave, having an angle of magnitude greater than the sine wave in FIG. 8.

The side walls of multiple cavities are defined using a diminished sine wave configuration. Referring now to FIG. 8 and FIG. 9, diminished sine waves are shown, in which the sine wave 60 follows a mathematical trajectory. For example, using axis x 65 and axis y 61, the diminished sine wave 60 will follow a diminishing wave amplitude where the magnitude of x will be zero at point 63.

The diminished sine wave 60 in FIG. 8 is shown where the angle 64 of maximum wave height is approximately 15 degrees from the y axis 61 to the angled limitation 62, so that the total degree for the maximum wave height is twice that of angle 64, or approximately 30 degrees.

The diminished sine wave 60 in FIG. 9 is shown where the angle 65 of maximum wave height is approximately 22.5 degrees from the Y axis to the angled limitation 62, so that the total degree for the maximum wave height is twice that of angle 65 or approximately 45 degrees.

Referring now to FIG. 10, in which a diminishing sine wave 60 is used to define the structure of the cavity walls in a multiple cavity situation, the sine wave configuration shown in FIG. 8 is seen in the side walls 21, 31 and 41 or cavities 20, 30 and 40. FIG. 10 depicts the use of a diminishing sine wave 60, as used in FIG. 8, to define the wall 21, 31, 41 configuration, where the diminishing sine wave in both Figures decreases in amplitude of x axis 65 along the y axis 61 to point 63. FIG. 11 shows the wall configuration for cavity walls 21, 31, and 41 where a diminishing sine wave, having a greater reduction in amplitude of the x axis 65 along the y axis 61 to point 63 is used. As FIG. 10 shows, a diminishing sine wave 60 with a smaller angle causes multiple cavities 20, 30 and 40 to be elongated, as compared with the diminishing sine wave 60 having a larger angle, as shown in FIG. 11, where the multiple cavities 20 and 30 are not defined as far along the length of the nose cone 10.

FIG. 8 depicts a diminishing sine wave 60, where the angle of maximum wave height is contained within an angle 65 of 22.5 degrees.

Use of multiple cavities is also shown in FIG. 12, in which multiple cavities 20, 30, 40, and 50 are shown, defined on both the forward and aft end of a nose cone 10. The cavity groups on each end may be linked together using a passageway 75 that allows air and/or fluid to pass between each chamber group. This nose cone 10 in FIG. 12 is capable of rapid movement forward or aft, with the passageway capable of being closed off as necessary. In all situations where multiple chambers are used, the secondary cavity, being the cavity that is smaller than the one it is adjoined to, will assist in promoting a pressure node 55 as described for FIG. 1 and FIG. 2. Where multiple cavities are used, with three or more cavities defined to create a cavity group, the largest cavity 20 will have a secondary cavity 30, with a sub secondary cavity 40 available if so defined, with each successively smaller cavity supporting the larger cavity before it, in providing a means to urge the rapid creation of a pressure node 55.

Referring now to FIGS. 13 and 14, an object 10 having a linear shape leading edge, as opposed to a cylindrical nose cone leading edge is shown. In this configuration, the creation of a pressure node 55 is done along a linear distance, as opposed to a rounded spike shape. The cross sectional view of the pressure node 55 in FIG. 14 would extend along the entire length of the object 10, as shown in FIG. 13, provided that the flow of liquids or gases into the cavities 20 and 30 are at a sufficient rate. The creation of the pressure node 55 is accomplished by allowing the flow of air and/or liquids to move into the cavity 20, where the flow vectors meet and provide an central strip of increased pressure. The pressure node is enhanced by the secondary cavity 30, which allows secondary pressure node to protrude out of the second cavity area into the primary cavity 20. The flow of liquids and gasses as described for FIG. 1 are duplicated with this linear cavity, in that the cross sectional view of FIG. 1 extends the length of the linear cavity in FIGS. 13 and 14. The example of the benefits for this configuration would be clearly seen for use on automobiles, where the cavity configuration would extend linearly and horizontally across the front of an automobile, the leading edge of a wing, or extend vertically, as in the instance of a bridge support, which must maintain position against a constant current. In both situations, the linear cavity protects the surface of the object from unnecessary friction caused by turbulence.

This method of creating a pressure node 55 has the ability to provide a smoother transition from subsonic to supersonic. In subsonic speeds, pressure waves flow over and around the leading edge of an object as well as the outer skin 1, with a dramatic increase in turbulence as the speed approached supersonic. As the object breaks through the sound barrier from subsonic to supersonic, the pressure waves tend to flatten out, and are angled from the leading edge of the object, as opposed to flowing around the surface skin 1 of the object from the leading edge on toward the rear. The pressure node 55 provides an artificial extension of the leading edge, that cushions the object itself from the violent turbulence that is consistent with speeds as they move into the supersonic range.

From the foregoing statements, summary and description in accordance with the present invention, it is understood that the same are not limited thereto, but are susceptible to various changes and modifications as known to those skilled in the art and we therefore do not wish to be limited to the details shown and described herein, but intend to cover all such changes and modifications which would be encompassed by the scope of the appended claims.

I claim:

1. A nose cone having a cavity which has an opening defined on its forward leading edge, where said cavity comprises:
   a. a circular mouth;
   b. an inner side wall, where the side wall forms a generally spherical cavity.

2. A nose cone, as recited in claim 1, in which the cavity's inner side wall defines a secondary cavity, defined by a mouth opening defined on the back rear side of the cavity's inner side wall, where the secondary cavity inner side wall forms a generally spherical shape.

3. A nose cone, as recited in claim 1, in which a plurality of cavities is defined, with a primary cavity, a secondary cavity, and a sub secondary cavity, where said cavities are contiguous with each other.

4. A nose cone, as recited in claim 1, in which the rearward back edge of the nose cone defines one or more cavities, and where the cavities defined in the rearward back edge are able to receive gasses or fluids from any front leading edge cavities through a connecting duct.

5. A nose cone, as recited in claim 1, in which the cavity wall follows the configuration of a diminishing sine wave.

6. A nose cone having a forward leading edge, and defining at least one cavity, where the cavity is accessible by a cavity mouth, with the walls of said cavity following the configuration of a diminishing sine wave, with secondary cavity side walls defined along the configuration of the diminishing sine wave.

7. A nose cone, as recited in claim 6, in which the nose cone comprises a cylindrical object, and where the defined cavity comprises a generally spherical shape.

8. A nose cone, as recited in claim 6, in which the nose cone comprises a cylindrical object, and where the defined cavity comprises a shape defined by a diminishing sine wave.

9. A nose cone, as recited in claim 6, in which the nose cone comprises a linear member, with the cavity comprising a linear configuration within the member.

10. A method of using a defined cavity to create a pressure node in front of an object that is in relative motion with respect to surrounding gasses or liquids, where the pressure node provides a means to divert oncoming gasses or liquids around the object in advance of the outer skin of the object comprising the following steps:
    a. positioning the nose cone of an object in a line of direct opposition to moving liquid or gas;
    b. allowing the liquid or gas to move through a mouth opening into a primary cavity, where the liquid or gas moves along the wall of the cavity;

c. rotating the liquid or gas within the cavity;

d. directing the flow of the rotating liquid or gas along the walls of the cavity to converge on a central point within the cavity;

e. the creation of a pressure node at the central point where the rotating liquids or gases converge; and f. allowing the pressure node to protrude forward of the object through the cavity mouth.

11. A method of using a defined cavity to create a pressure node in front of an object, as described in claim 10, comprising the additional following step of allowing the liquid or gas to move through a second mouth opening into a secondary cavity, where the liquid or gas moves along the wall of the secondary cavity and rotates until a secondary pressure node is created, which protrudes through the secondary cavity mouth into the primary cavity.

12. A method of using a defined cavity to create a pressure node in front of an object, as described in claim 10, comprising the additional following step of allowing the liquid or gas to move through into secondary cavities, where there are more than two cavities, and allowing the liquid or gas moves along the wall of each of the secondary cavities and rotated until a secondary pressure node is created in each of the secondary cavities.

13. A method of using a defined cavity to create a pressure node in front of an object, as described in claim 10, comprising the following step of defining any cavity walls to follow the contours defined by a diminishing sine wave.

* * * * *